United States Patent Office 3,014,968
Patented Dec. 26, 1961

3,014,968
ALLYL DERIVATIVES OF PINACOLONE-TYPE COMPOUNDS
Emil Kaiser and Ellen Gunther, Chicago, Ill., assignors, by mesne assignments, to Armour & Company, Chicago, Ill., a corporation of Delaware
No Drawing. Filed June 16, 1959, Ser. No. 820,586
3 Claims. (Cl. 260—590)

This invention relates to allyl derivatives of pinacolone-type compounds. More particularly this invention relates to allyl derivatives of 4,4-bis(4-hydroxyphenyl)-3-hexanone and to methods for their preparation. These new derivative compounds are useful as intermediates in the synthesis of certain diallyl derivatives of diethylstilbestrol and hexestrol which diallyl derivatives are described in U. S. Patents No. 2,502,324 and No. 2,502,325, respectively.

The preferred starting material for preparing our derivatives is 4,4-bis(4-hydroxyphenyl)-3-hexanone. This pinacolone-type compound has been described in the literature and may be prepared in any of a number of ways, at least one of which has been patented. One method involves the use of a starting material such as 3,4-bis(4-hydroxyphenyl)-3,4-hexanediol which is subjected to treatment with gaseous hydrogen chloride to ultimately yield the desired product in solid form.

We have discovered that 4,4-bis(4-hydroxyphenyl)-3-hexanone may be reacted with an allyl halide to prepare the diallyl ether of the pinacolone-type compound. Although satisfactory yields of the desired diallyl ether derivative may be obtained with theoretical amounts of the halide employed, it is preferred that it be present in slight excess. The reaction may be carried out in the presence of an alkaline compound capable of reacting with the halogen element of the halide. Examples of such alkaline compounds are potassium carbonate, calcium carbonate, sodium hydroxide, or barium hydroxide. Preferably the reaction is conducted in an organic solvent which is not reactive with the diallyl ether product. Examples of such organic solvents are methylethyl ketone, acetone, benzene, and the like.

In practice the starting material may be mixed with the organic solvent and the alkaline compound and, thereafter, the allyl halide added. The mixture is then preferably refluxed with agitation for a sufficient time to permit the reaction to go to completion, usually from 4 to 8 hours. Any insoluble material formed is removed by filtration and the organic solvent evaporated. The oily residue remaining is then contacted with a dilute alkaline solution such as, for example, aqueous sodium hydroxide. The desired product may then be separated and purified by any suitable procedure.

The reaction is described by the following formulae:

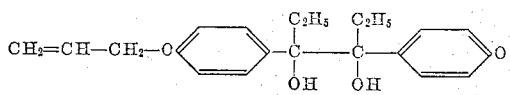

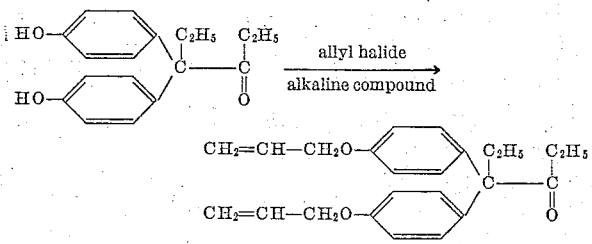

We have further discovered that the 4,4-bis(4-allyloxyphenyl)-3-hexanone prepared in accordance with the above-described procedure may be converted to 4,4-bis(3-allyl-4-hydroxyphenyl)-3-hexanone by dissolving the diallyl ether in a suitable solvent such as diethylaniline and refluxing in an inert atmosphere such as nitrogen gas. The reaction mixture may then be cooled and a precipitate formed by adding a dilute acid solution. Recovery and purification can be accomplished by any of the well understood procedures.

The reaction to prepare 4,4-bis(3-allyl-4-hydroxyphenyl)-3-hexanone is described by the following formulae:

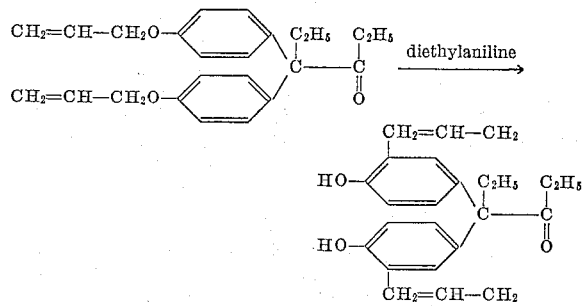

We have further discovered an alternative method for preparing both 4,4-bis(4-allyloxyphenyl)-3-hexanone and 4,4-bis(3-allyl-4-hydroxyphenyl)-3-hexanone. This alternative method is not only extremely practical but serves to substantiate the structure of these compounds as produced in accordance with the steps outlined hereinabove.

The starting material for the alternative procedure is 3,4-bis(4-allyloxyphenyl)-3,4-hexanediol, a new compound described in our co-pending application Serial No. 820,587, filed June 16, 1959. This pinacol-type compound is refluxed with a mixture of acetic anhydride and acetyl chloride for a suitable period of time, usually from 2 to 8 hours. Water is then added and the water-insoluble product extracted with a solvent such as ether. Employing well understood methods of recovery and purification, 4,4-bis(4-allyloxyphenyl)-3-hexanone is obtained as an oily liquid.

An interesting and entirely unexpected feature of this method is that the pinacol-type starting compound undergoes a rearrangement instead of dehydration upon treatment with the acetic anhydride acetyl chloride mixture.

The reaction is described by the following formulae:

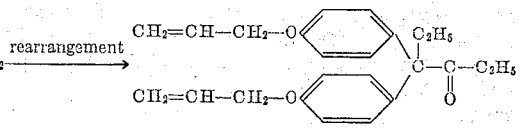

To obtain 4,4-bis(3-allyl-4-hydroxyphenyl)-3-hexanone by this alternative method, the oily 4,4-bis(4-allyloxyphenyl)-3-hexanone is employed as the starting material. This compound undergoes the Claisen rearrangement to yield the desired 4,4-bis(3-allyl-4-hydroxyphenyl)-3-hexanone as a crystalline solid.

The reaction is described by the following formulae:

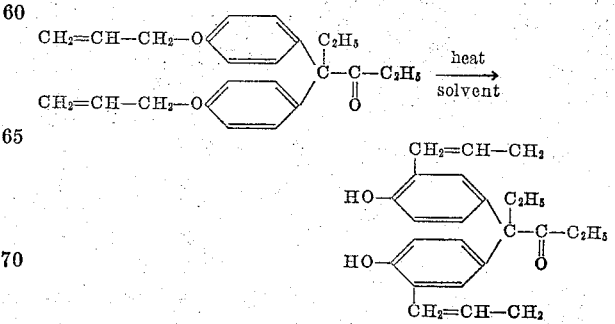

As indicated above the compounds described herein find use as intermediates in the preparation of other derivative compounds having estrogenic activity in varying degrees, namely, certain diallyl derivatives of diethylstilbestrol and hexestrol. By way of example, the diallyl ether of diethylstilbestrol may be prepared from 4,4-bis(4-allyloxyphenyl)-3-hexanone in accordance with a procedure described in the literature. This process would involve reduction of 4,4-bis(4-allyloxyphenyl)-3-hexanone with sodium in amyl alcohol followed by retropinacolone rearrangement. The resulting compound may be represented by the following structural formula:

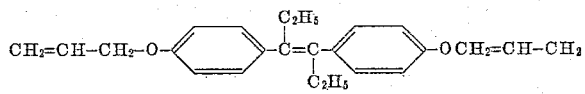

Similarly, 4,4-bis(3-allyl-4-hydroxyphenyl)-3-hexanone may be employed to give 3,3'-diallyl diethylstilbestrol which may be represented by the following structural formula:

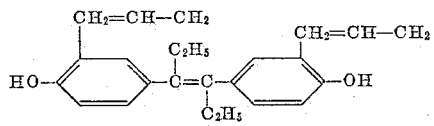

One of the important advantages in employing our intermediates in making diallyl derivatives of diethylstilbestrol and hexestrol resides in the elimination of the necessity for starting with a free estrogen to reach the desired end product. Free estrogens are known to have adverse physiological effects on workers handling them. Therefore, any compound that will enable the production of useful estrogenic compositions while overcoming this hazard to workers is of very definite value to manufacturers of ethical prepartions. Our intermediates provide such a vehicle.

Specific examples of the preparation of the derivatives follows:

EXAMPLE I

*4,4-bis(4-allyloxyphenyl)-3-hexanone*

Five grams of 4,4-bis(4-hydroxyphenyl)-3-hexanone were dissolved in 25 ml. of methyl ethyl ketone. To this solution, 6.5 grams of anhydrous potassium carbonate and 3.9 ml. of allyl bromide were added and the mixture stirred and refluxed for 7 hours. The insoluble material was removed by filtration, the methyl ethyl ketone evaporated and the oily residue triturated with 100 ml. of 5% aqueous sodium hydroxide solution. After decantation the oil was dissolved in ether, the ether solution washed with water, dried over sodium sulfate and the solvent evaporated. The residue was an oil and weighed 6.5 grams.

EXAMPLE II

*4,4-bis(3-allyl-4-hydroxyphenyl)-3-hexanone*

6.5 grams of 4,4-bis(4-allyloxyphenyl)-3-hexanone were dissolved in 50 ml. of diethylaniline and refluxed in an atmosphere of nitrogen for 6 hours. After cooling, the solution was added to 400 ml. of 2N-hydrochloric acid and upon standing, the precipitate solidified. This was filtered off, washed with water, dissolved in ether and the solution dried over sodium sulfate. A part of the ether was removed by distillation and Skelly F added to the concentrate until a small precipitate formed. The precipitate was removed and more Skelly F added. An oil separated on the bottom upon chilling. The upper layer was decanted and more Skelly F added. After standing in a cold room, crystals were deposited. These were filtered off and dried. M.P. 134–137° C. Yield 4–3 grams.

EXAMPLE III 1.9 grams of 3,4-bis(4-allyloxyphenyl)-3,4-hexanediol was refluxed with a mixture of 10 ml. of acetic anhydride and 10 ml. of acetyl chloride for 4 hours. After cooling, the solution was added to 300 ml. of water and stirred vigorously. Extraction with ether removed the water-insoluble product. The ether extract was washed with a saturated sodium bicarbonate solution, then with water, and finally dried over sodium sulfate. After evaporation of the ether under reduced pressure, an oil remained which could not be crystallized. In the infrared spectrum ketone absorption was found. The compound was 4,4-bis(4-allyloxyphenyl)-3-hexanone.

EXAMPLE IV

*Claisen rearrangement*

The oily 4,4-bis(4-allyloxyphenyl)-3-hexanone was refluxed with 20 ml. of diethylaniline in an atmosphere of nitrogen for 4 hours. After cooling, the solution was added to 300 ml. of 2N hydrochloric acid and stirred vigorously. The mixture was extracted with ether, the ether solution washed with water, dried over sodium sulfate and part of the ether evaporated. Skelly F was added to the concentrated ether solution until a small precipitate was formed. This precipitate was removed by filtration and more Skelly F was added. Upon chilling, crystals were deposited which were collected on a filter and then dried. The 4,4-bis(3-allyl-4-hydroxyphenyl)-3-hexanone had a melting point of 134–137° C. yield 0.6 gram.

In the foregoing detailed description we have given specific examples and procedures illustrating the invention. It is understood that these specific examples are for illustration only and that the invention can be practiced in a great variety of ways.

We claim:
1. 4,4-bis(4-allyloxyphenyl)-3-hexanone.
2. 4,4-bis(3-allyl-4-hydroxyphenyl)-3-hexanone.
3. A compound having the formula

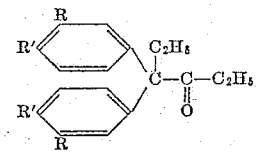

wherein R is selected from the group consisting of hydrogen and an allyl radical, and R' is selected from the group consisting of hydroxy and allyloxy radicals, provided that when R is hydrogen R' is allyloxy and that when R' is hydroxy R is allyl.

References Cited in the file of this patent

UNITED STATES PATENTS 2,502,324     Kaiser et al. _____ Mar. 28, 1950

OTHER REFERENCES

Hobday et al.: J. Chem. Soc. (London), 1943, pages 609–12.

Fuson et al.: J. Am. Chem. Soc. vol. 73, pages 4980–1 (1951).

Bencze et al.: J. Org. Chem. vol 22, pages 352–3 (1957).